No. 758,560. PATENTED APR. 26, 1904.
R. S. PEASE.
BAIT FOR DRAWING GLASS.
APPLICATION FILED JAN. 20, 1903.
NO MODEL.

WITNESSES
INVENTOR
Roger S. Pease

No. 758,560. Patented April 26, 1904.

UNITED STATES PATENT OFFICE.

ROGER S. PEASE, OF PITTSBURG, PENNSYLVANIA, ASSIGNOR TO WINDOW GLASS MACHINE COMPANY, OF PITTSBURG, PENNSYLVANIA, A CORPORATION OF NEW JERSEY.

BAIT FOR DRAWING GLASS.

SPECIFICATION forming part of Letters Patent No. 758,560, dated April 26, 1904.

Application filed January 20, 1903. Serial No. 139,829. (No model.)

*To all whom it may concern:*

Be it known that I, ROGER S. PEASE, of Pittsburg, Allegheny county, Pennsylvania, have invented a new and useful Bait for Drawing Glass, of which the following is a full, clear, and exact description, reference being had to the accompanying drawings, forming part of this specification, in which—

Figure 1:
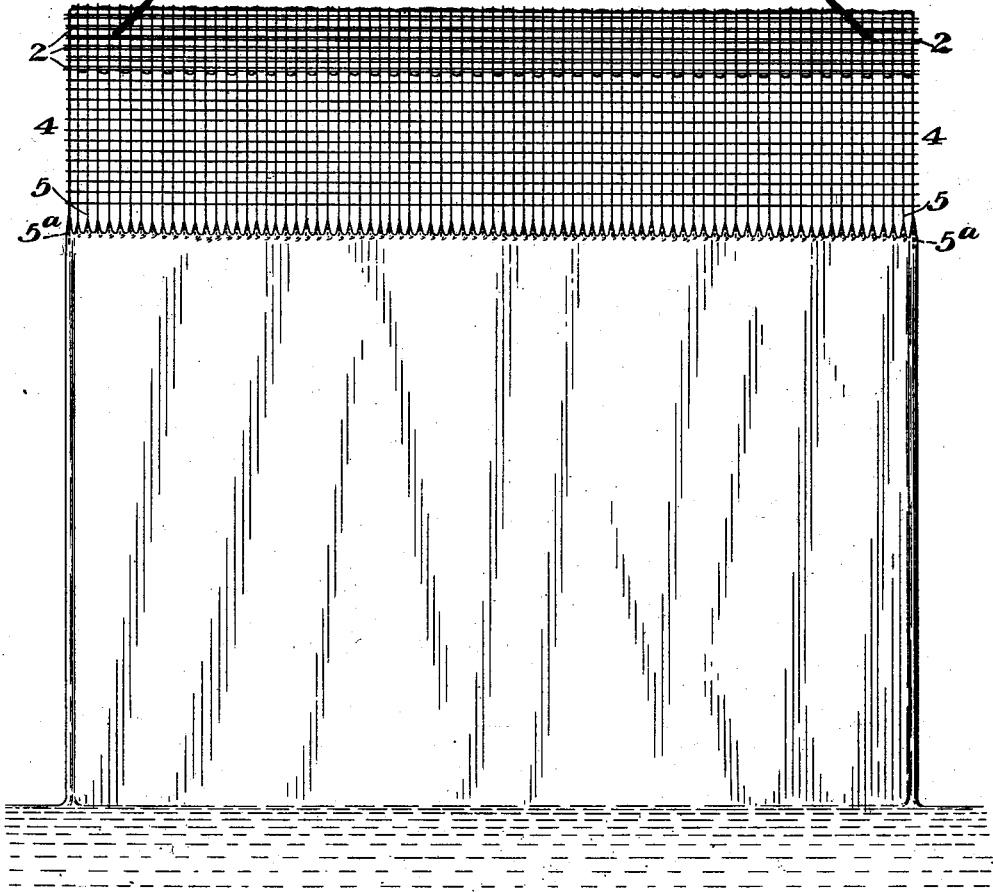
Figure 4:
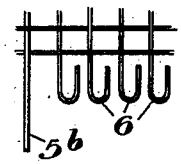
Figure 2:
Figure 3:
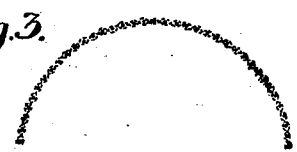

Figure 1 is a front elevation showing the drawing of a glass sheet from a molten bath according to my invention. Fig. 2 is a cross-section of the bait of Fig. 1. Fig. 3 is a cross-section of another form of bait, and Fig. 4 is a broken detail showing another form of the lower edge of the bait.

My invention relates to the drawing of glass articles from a bath of molten glass, and is designed to provide a new and improved bait for this purpose.

Heretofore in drawing glass the bait, which is lowered into the bath to start the drawing operation, has been made of glass, as metal has been found to cause checks and cracking, which destroy the article being drawn. These glass baits must be preheated and are a source of annoyance and expense. I have found that by using a series of separated points or pins which are spaced apart from each other a metallic bait can be used without cracking or checking of the article drawn.

In the form of Figs. 1 and 2 the bait is formed of wire netting or cloth, which is preferably folded over in its upper part 2 to give a double thickness for attaching the wire loop 3 or other means for raising. The intermediate part 4 of the bait is shown as of single thickness, and the lower cross-wires are removed, leaving the vertical wires 5 projecting below the cross-wire for a considerable distance. This is important, since I have found that if the netting enters the bath far enough for the glass to harden around a cross-wire as this part of the glass chills it will check and crack the article. I have also found it advantageous for strength of the bait and for starting the drawing to extend one or more of the end vertical wires $5^a$ below the others, as shown by the dotted lines in Fig. 1 and in full lines at $5^b$ in Fig. 4.

In using the bait it is lowered into the bath sufficiently for the glass to become well secured to the vertical wires below the cross-wires, and the bait is then lifted in the usual manner to draw out the article. As the lifting is started the glass draws into a series of points upon the wires, as shown, the points securing to the bait the article formed by further lifting. By reason of the separation of the metallic points I find in practice that the articles are successfully drawn without checking and that the bait works better than a glass bait.

The bait may be of any form in cross-section. Thus in Fig. 3 I show one semicircular in form. For drawing a cylinder a cylindrical bait is used, and the bait will be readily varied by those skilled in the art according to the article desired.

Instead of having the vertical wires straight, as shown in Fig. 1, I may bend their lower ends in different ways. Thus in Fig. 4 I show them as having hook-shaped ends 6.

The advantages of my invention result from doing away with heating of the bait, from its more permanent character, and from the doing away with cracking of the article, also from the ease of detaching the article by merely bending the wires back and forth.

The points or pins may be fastened in a solid metallic base or support which is drawn up, and many other variations may be made without departing from my invention, since I consider myself the first to use a bait having a series of separated points or teeth.

I claim—

1. A bait for drawing glass having a series of separated points or pins depending from its lower end; substantially as described.

2. A bait for drawing glass consisting of wire fabric having vertical wires depending below the fabric and arranged to enter the bath; substantially as described.

3. A bait for drawing glass having a depending series of separated points or pins, the end pins projecting down below the intermediate pins; substantially as described.

In testimony whereof I have hereunto set my hand.

ROGER S. PEASE.

Witnesses:
L. M. REDMAN,
H. M. CORWIN.